_United States Patent_ [19]

Walling et al.

[11] 4,380,965
[45] Apr. 26, 1983

[54] ELECTRODE FOR A FLUIDIZABLE BED COATING APPARATUS

[75] Inventors: Jorg-Hein Walling, Beaconsfield; Andre Dumoulin, Montagnes; Gerald R. Arbuthnot, Chateauguay, all of Canada

[73] Assignee: Northern Telecom Limited, Montreal, Canada

[21] Appl. No.: 312,650

[22] Filed: Oct. 19, 1981

[51] Int. Cl.³ ............................................. F26B 17/00
[52] U.S. Cl. ........................... 118/621; 118/DIG. 5; 427/185; 427/27
[58] Field of Search ................ 118/629, DIG. 5, 621; 427/185, 27

[56]   References Cited
U.S. PATENT DOCUMENTS

| | | | |
|---|---|---|---|
| 1,958,406 | 5/1934 | Darrah | 118/629 |
| 2,815,550 | 12/1957 | Valyi | 117/DIG. 6 |
| 2,968,683 | 1/1961 | Kossman | 118/DIG. 5 |
| 3,031,337 | 4/1962 | Watanabe | 118/629 |
| 3,136,705 | 6/1964 | Sommers | 117/DIG. 6 |
| 3,248,253 | 4/1966 | Barford | 118/629 |
| 3,496,413 | 2/1970 | Goodridge | 118/DIG. 5 |
| 4,101,687 | 7/1978 | Knudsen | 427/27 |
| 4,235,024 | 11/1980 | Chauvin et al. | 118/DIG. 5 |

Primary Examiner—Norman Morgenstern
Assistant Examiner—Richard Bueker
Attorney, Agent, or Firm—R. J. Austin

[57]     ABSTRACT

An electrode for a fluidizable bed coating apparatus comprising a plurality of electrically conductive tubes and a tube carrier. The tubes extend from the carrier and have free ends at which there is a concentration in intensity of an electric field when the tubes are connected into an electric circuit, and the tubes channel fluidizing gas through them and through the concentrations in intensity of the electric field.

6 Claims, 3 Drawing Figures

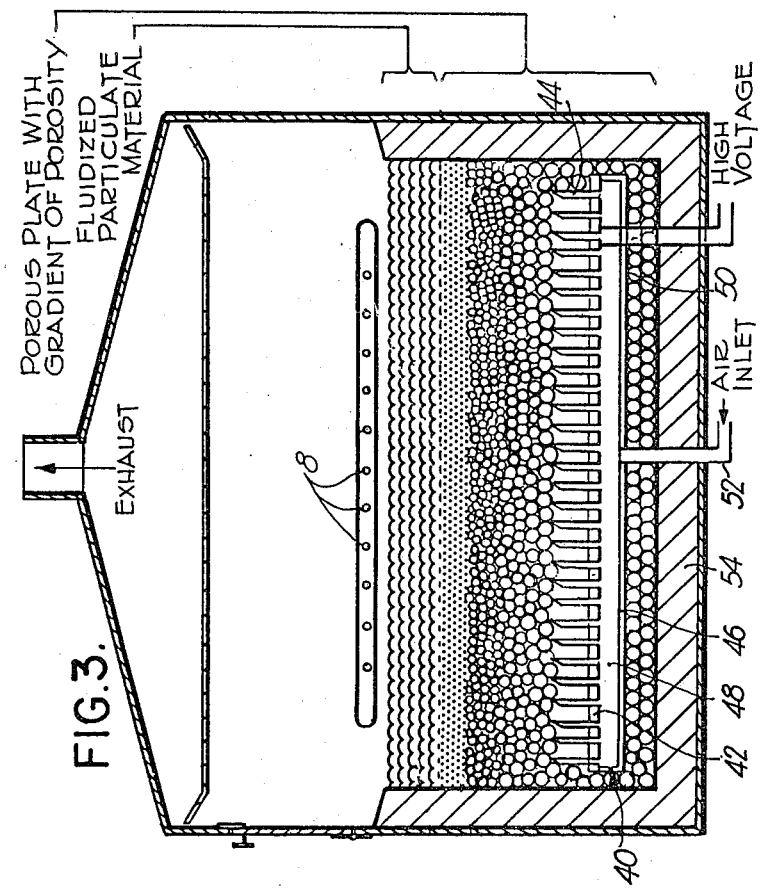

ELECTRODE FOR A FLUIDIZABLE BED COATING APPARATUS

This invention relates to electrodes for fluidizable bed coating apparatus.

In electrostatic fluidized bed coating apparatus, it is known to pass a fluidizing gas through a porous support whereby the gas passes from the support upwardly to fluidize a bed of particulate coating powder material disposed upon the support. To provide the electrostatic coating action, articles to be coated are disposed above the level of the fluidized bed and are connected to a high voltage potential. The air is charged and in turn conveys this charge to the particles in the bed as it passes through the bed whereby these charged particles, which are of small size, are attracted electrostatically to the surface of the article. Upon reaching the surface, they tend to be held against it by the electrostatic force sufficiently long to enable the article to be given a heat treatment to cause the particles to fuse together and to form the coat. In such apparatus, problems are associated with charging the air in an efficient and safe manner to enable it to charge the powder in turn. In early fluidiz bed constructions, it was known to charge the air by placing an electrode above the support and at the bottom of the fluidizable bed. However, such a location of the electrode led to problems in that arcing sometimes occurred between the electrode and the workpiece thus resulting in fires or explosions. Also it was not unknown for an operator of the equipment to have electric shocks when placing his hand above or just within the fluidizable bed chamber. Of course, shorting of the electrical current could also occur if a tool was dropped inadvertently into the bath. To overcome this problem, it has been suggested to place the electrode in a plenum beneath the support, but this has disadvantages also. One disadvantage is that the plenum needs to be larger than previously, thus having a greater volume of pressurized air under the support. Should the support rupture, then there will be a large amount of pressurized air in the plenum rushing through the support and through the fluidized bed whereby, when circumstances are such that an explosion is a possibility, then this large amount of air would increase the size of the explosion in conjunction with the large dust cloud then formed. A further disadvantage with this type of electrode, is that the air is not entrained around or through the electrode before it passes through the support. Thus an extremely inefficient method of charging the air results as some of the air need not pass close to or through the electrode before reaching the powder.

This situation has been improved by a structure described in Canadian Pat. No. 1,070,184 granted Jan. 22, 1980 to Canada Wire and Cable Company. As described in that specification, an electrode means is included in the apparatus, the electrode means having multiple charge concentrating portions. Means is provided for directing air preferentially into contact with the charge concentrating portions. With this apparatus, some arrangement is provided therefore, for directional control of air towards or through the electrode means whereby the air is charged more efficiently than previously. As described in that specification, the charge concentrating portions are at the ends of fine wires which were located together in the form of a brush assembly. The air directing means is provided by holes in a plate beneath the wires, the holes being aligned with the ends of the wires. While this apparatus is an improvement, there is no control, apart from the speed of the fluidized air, upon the direction it will take after passing through the hole. Thus, there is no guarantee that all of the air becomes efficiently charged.

The present invention is concerned with the construction of an electrode in which the air may be charged more efficiently than has been possible previously.

According to the present invention, there is provided an electrode for a fluidizable bed coating apparatus comprising a plurality of electrically conductive tubes and a tube carrier, the tubes extending from the carrier and having free ends similar to a syringe needle at which there is a concentration in intensity of an electric field when the tubes are connected to a source of the electric current, the tubes providing channelling for a fluidizing gas passing from one side of the support to the other to ensure that the gas passes through the concentrations in intensity of the electric fields.

The tubes may be connected individually to the source of electric current. However, it is preferable that the tube carrier is also electrically conductive and the tubes are electrically connected to the carrier whereby the carrier itself may be connected to the current source to provide the electric fields around the free ends of the tubes.

In a further preferred arrangement, the tubes have tapered free ends to concentrate the electric fields directly at the extreme points of these ends.

In the electrode according to the invention, the electrode may merely comprise a tube carrier with the tubes extending from it or may, in addition, comprise a structure defining a plenum of which the carrier forms one side. In either case, the tubes may extend from one side or both sides of the carrier. If the tubes extend from both sides of the carrier, i.e. in opposite directions, then clearly each tube has two free ends at each of which there is a concentration in the intensity of the electric field.

Embodiments of the invention will now be described by way of example with reference to the accompanying drawings in which:

FIG. 3 is a view similar to FIG. 2 of electrostatic coating apparatus including an electrode according to a second embodiment.

Figure 1:
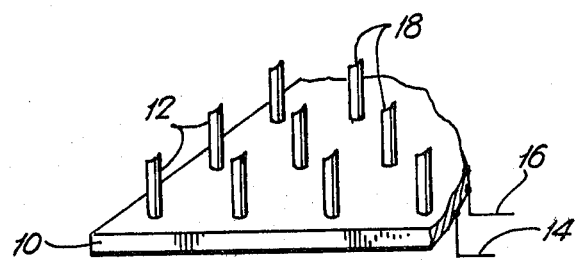
FIG. 1 is an isometric view of part of an electrode according to a first embodiment.

As shown by FIG. 1, in a first embodiment an electrode comprises an electrically conductive metal tube carrier 10 having a plurality of parallel electrically conductive tubes 12 extending side-by-side from one side of the plate 10. The tubes are secured by soldering or other methods of attachment through holes in the carrier whereby the passageways through the tubes allow air to pass from one side of the carrier to the other. The method of attachment must, according to this embodiment, ensure that an electrically conductive connection is provided between the tubes and the carrier 10. On the side of the carrier remote from the tubes are provided two terminals 14 and 16 for connection of electric wiring to pass an electric current of up to 100 Kv through the carrier. The tubes are each tapered at their free ends 18 as shown by FIG. 1.

Figure 2:
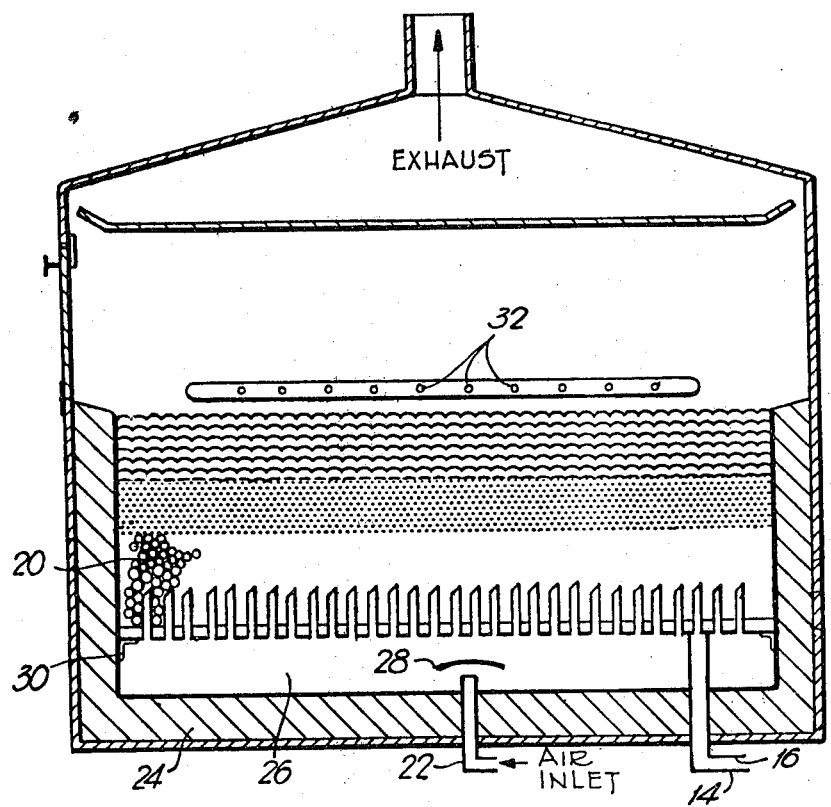
FIG. 2 is a cross-sectional view through an electrostatic coating apparatus including the electrode.

As shown by FIG. 2, the electrode is disposed within a fluidizable bed housing 19 in the manner described in a patent application filed concurrently with this application in the names of J. H. Walling, G. Arbuthnot and A. Dumoulin entitled "Fluidizable Bed Structure".

As described in the aforementioned application and shown by FIG. 2, the electrode is disposed beneath a deep support member 20 so as to be attached to its bottom surface with the face plate 10 in contact with the bottom surface. The tubes extend partly upwardly through the member 20 to terminate at their free ends. In use of the electrostatic coating apparatus, the air is passed under pressure through inlet 22 in a base of the housing 24 of the apparatus and is dispersed across the base into a plenum 26 by virtue of a deflector plate 28 located above the inlet 22. The base plate is fluid-tightly sealed around its edges by contact with a support flange 30. Therefore, the only way the pressurized air may proceed upwardly the support is by passing through the tubes. As the pressurized air passes through the tubes, it is charged by contact with the tube surfaces and, upon leaving the tubes from their free ends, the air passes through regions of intense concentration of the electric fields which regions centre around the extreme upper ends of the tapered tubes. Thus, all of the air is forced to pass through the regions of intense concentration of the electric fields. Hence it is assured that all of the air is fully charged before passage through the porous support 20 so that the charging procedure is as efficient as possible. Efficient charging of the particles in bed 29 thereafter results.

By the use of the electrode described in the first embodiment, the powder is more completely charged than has hitherto been possible, thus ensuring that particles, attracted electrostatically to electrical conductors 32 passing above the bed, will adhere by the electrostatic force more positively than has previously been possible. As a result of this, after passage of the electric conductors through the oven, a more uniform coat substantially free of pinholes, is provided.

In a second embodiment, as shown by FIG. 3, in which an electrostatic coating apparatus is substantially the same as in the first embodiment, an electrode 40 has a carrier 42 and tubes 44 of the construction as described in the first embodiment. In the second embodiment however, the carrier 42 forms an upper side of a structure 46 which itself defines a plenum 48. The base 50 of the structure has an inlet tube 52 passing through it for the inlet of air under pressure.

As shown by the second embodiment, and also as described in the copending patent application referred to, the structure 46 is completely embedded within the support 20 with part of the support extending downwardly below the electrode to be carried upon the base 54 of the electrostatic coating apparatus.

The operation of the second embodiment is similar to that described with regard to the first embodiment and offers the advantages referred to with regard to the first embodiment.

What is claimed is:

1. A fluidizable bed coating apparatus comprising a porous support member having an upper surface to support a bed of fluidizable coating powder, an electrode disposed completely beneath the upper surface of the support member, the electrode comprising a plurality of electrically conductive tubes and a gas impervious carrier for the tubes, and means to connect a source of electric current to the electrode, the tubes extending from the carrier and having free ends at each of which there is a concentration in intensity of an electric field when the electrode is connected to the source of electric current, the tubes providing channelling for a fluidizing gas passing from one side of the carrier to the other to ensure that the gas passes through the concentrations in intensity of the electric field.

2. Apparatus according to claim 1, wherein the carrier is electrically conductive and the tubes are electrically conductively connected to the carrier.

3. Apparatus according to claim 2, wherein some at least of the tubes have free ends with tube end surfaces which are disposed at a bias angle to the tube axis.

4. Apparatus according to claim 1, wherein the carrier is part of a structure defining a plenum having an inlet for pressurized air and with pressurized air outlets provided by the tubes.

5. Apparatus according to claim 1, wherein each tube extends from one side only of the carrier.

6. Apparatus according to claim 1, wherein each tube extends from both sides of the carrier.

* * * * *